(12) United States Patent
Terwilliger et al.

(10) Patent No.: US 12,215,623 B1
(45) Date of Patent: Feb. 4, 2025

(54) PARTIAL EXHAUST BOTTOMING CYCLE

(71) Applicant: RTX CORPORATION, Farmington, CT (US)

(72) Inventors: Neil J. Terwilliger, Cheshire, CT (US); Lance L Smith, West Hartford, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/457,465

(22) Filed: Aug. 29, 2023

(51) Int. Cl.
  *F02C 7/143* (2006.01)
  *F02C 3/06* (2006.01)
  *F02C 3/30* (2006.01)
  *F02C 7/16* (2006.01)

(52) U.S. Cl.
  CPC .............. *F02C 7/1435* (2013.01); *F02C 3/06* (2013.01); *F02C 3/30* (2013.01); *F02C 3/305* (2013.01); *F02C 7/16* (2013.01); *F05D 2220/323* (2013.01); *F05D 2260/212* (2013.01); *F05D 2260/609* (2013.01)

(58) Field of Classification Search
  CPC .......... F01K 21/047; F01K 23/10; F02C 3/30; F02C 3/305; F02C 7/14; F02C 7/1435
  See application file for complete search history.

(56) References Cited

U.S. PATENT DOCUMENTS

| 7,966,829 B2 | 6/2011 | Finkenrath et al. |
| 11,506,124 B2 | 11/2022 | Staubach et al. |
| 2017/0211474 A1* | 7/2017 | Sennoun ............ F02K 3/06 |

FOREIGN PATENT DOCUMENTS

WO  WO-2022028653 A1 *  2/2022  ............ B64D 27/18

OTHER PUBLICATIONS

English translation of WO2022028653 (Year: 2022).*

* cited by examiner

*Primary Examiner* — Scott J Walthour
(74) *Attorney, Agent, or Firm* — Carlson, Gaskey & Olds, P.C.

(57) ABSTRACT

An aircraft propulsion system includes a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is split into at least a first exhaust gas flow and a second exhaust gas flow, and a condenser where water is extracted from the second exhaust gas flow, and a bottoming cycle where extracted water is transformed into a steam flow and injected into the core flow path.

14 Claims, 2 Drawing Sheets

PARTIAL EXHAUST BOTTOMING CYCLE

TECHNICAL FIELD

The present disclosure relates generally to an aircraft propulsion system that extracts water from a partial portion of the exhaust gas flow.

BACKGROUND

Reduction and/or elimination of carbon emissions generated by aircraft operation is a stated goal of aircraft manufacturers and airline operators. Turbine engines compress incoming core airflow, and mix the compressed airflow with fuel that is ignited in a combustor to generate an exhaust gas flow. Steam injection can provide improved propulsive efficiencies. Water recovered from the exhaust gas flow may be transformed into steam using thermal energy from the exhaust gas flow. Aircraft propulsion systems may not have sufficient heat absorption capacity to efficiently condense and extract sufficient amounts of water from all desired operational uses.

SUMMARY

An aircraft propulsion system according to an exemplary embodiment of this disclosure includes, among other possible things, a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, the exhaust gas flow is split into at least a first exhaust gas flow and a second exhaust gas flow, and a condenser where water is extracted from the second exhaust gas flow, and a bottoming cycle where extracted water is transformed into a steam flow and injected into the core flow path.

In a further embodiment of the foregoing aircraft propulsion system, the bottoming cycle is configured to extract heat from the second exhaust gas flow for generating the steam flow.

In a further embodiment of any of the foregoing aircraft propulsion systems, the bottoming cycle is configured to precool the second exhaust gas flow prior to communication to the condenser.

In a further embodiment of any of the foregoing aircraft propulsion systems, the bottom cycle includes a closed circuit where a thermal transfer medium is heated in an evaporator, pressurized in a compressor, and cooled within a heat exchanger. A portion of the second exhaust gas flow is cooled in the evaporator and communicated to the condenser.

In a further embodiment of any of the foregoing aircraft propulsion systems, the bottom cycle further includes a pump for pressurizing the thermal transfer medium that is communicated through the evaporator.

In a further embodiment of any of the foregoing aircraft propulsion systems, the heat exchanger is in thermal communication with a cold sink flow for cooling the thermal transfer medium.

In a further embodiment of any of the foregoing aircraft propulsion systems, the cold sink flow includes at least one of a cooling airflow, a cryogenic fuel flow or a water flow.

In a further embodiment of any of the foregoing, the aircraft propulsion system further includes a steam turbine where power is extracted from the steam flow prior to injection into the core flow path.

In a further embodiment of any of the foregoing, the aircraft propulsion system includes an intercooling system and a portion of water that is extracted by the condenser is communicated to the compressor section for cooling a portion of the core flow.

In a further embodiment of any of the foregoing aircraft propulsion systems, the second exhaust gas flow is drawn from a location within the turbine section that is upstream of an aft exit of the turbine section.

In a further embodiment of any of the foregoing, the aircraft propulsion system includes a propulsive fan that is driven by the turbine section.

A turbine engine assembly according to another exemplary embodiment of this disclosure includes, among other possible things, a core engine that defines a core flow path and is configured to generate an exhaust gas flow, a condenser that is configured to receive a partial portion of the exhaust gas flow and to extract water from the partial portion of the total exhaust gas flow, and a bottoming cycle where extracted water is transformed into a steam flow and injected into the core flow path, the bottoming cycle is configured to extract heat from the exhaust gas flow for generating the steam flow and to precool the partial portion of the exhaust gas flow prior to communication to the condenser.

In a further embodiment of the foregoing turbine engine assembly, the bottom cycle includes a closed circuit where a thermal transfer medium is heated in an evaporator, pressurized in a compressor, and cooled within a heat exchanger. The partial portion of the exhaust gas flow is cooled in the evaporator and communicated to the condenser.

In a further embodiment of any of the foregoing turbine engine assemblies, the heat exchanger is in thermal communication with at least one of a cooling airflow, a cryogenic fuel flow or a water flow for cooling the thermal transfer medium.

In a further embodiment of any of the foregoing, the turbine engine assembly further includes a steam turbine where power is extracted from the steam flow prior to injection into the core flow path.

In a further embodiment of any of the foregoing, the turbine engine assembly includes an intercooling system and a portion of water that is extracted by the condenser is communicated to the core engine for cooling a portion of the core flow.

In a further embodiment of any of the foregoing turbine engine assemblies, the partial portion of the exhaust gas flow is drawn from a location within the turbine section that is upstream of an aft exit of the turbine section.

A method of operating a turbine engine according to another exemplary embodiment of this disclosure includes, among other possible things, generating an exhaust gas flow, cooling a partial portion of the exhaust gas flow with a portion of a bottoming cycle, extracting water from a partial portion of the total exhaust gas flow in a condenser, and generating a steam flow from the extracted water with thermal energy from the exhaust gas flow.

In a further embodiment of the foregoing, the method further includes cooling a thermal transfer medium of the bottoming cycle with at least one of a cooling airflow, a cryogenic fuel flow or a water flow for cooling the thermal transfer medium.

In a further embodiment of any of the foregoing, the method further includes cooling a portion of a core flow with a portion of water that is extracted from the partial portion of the exhaust gas flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
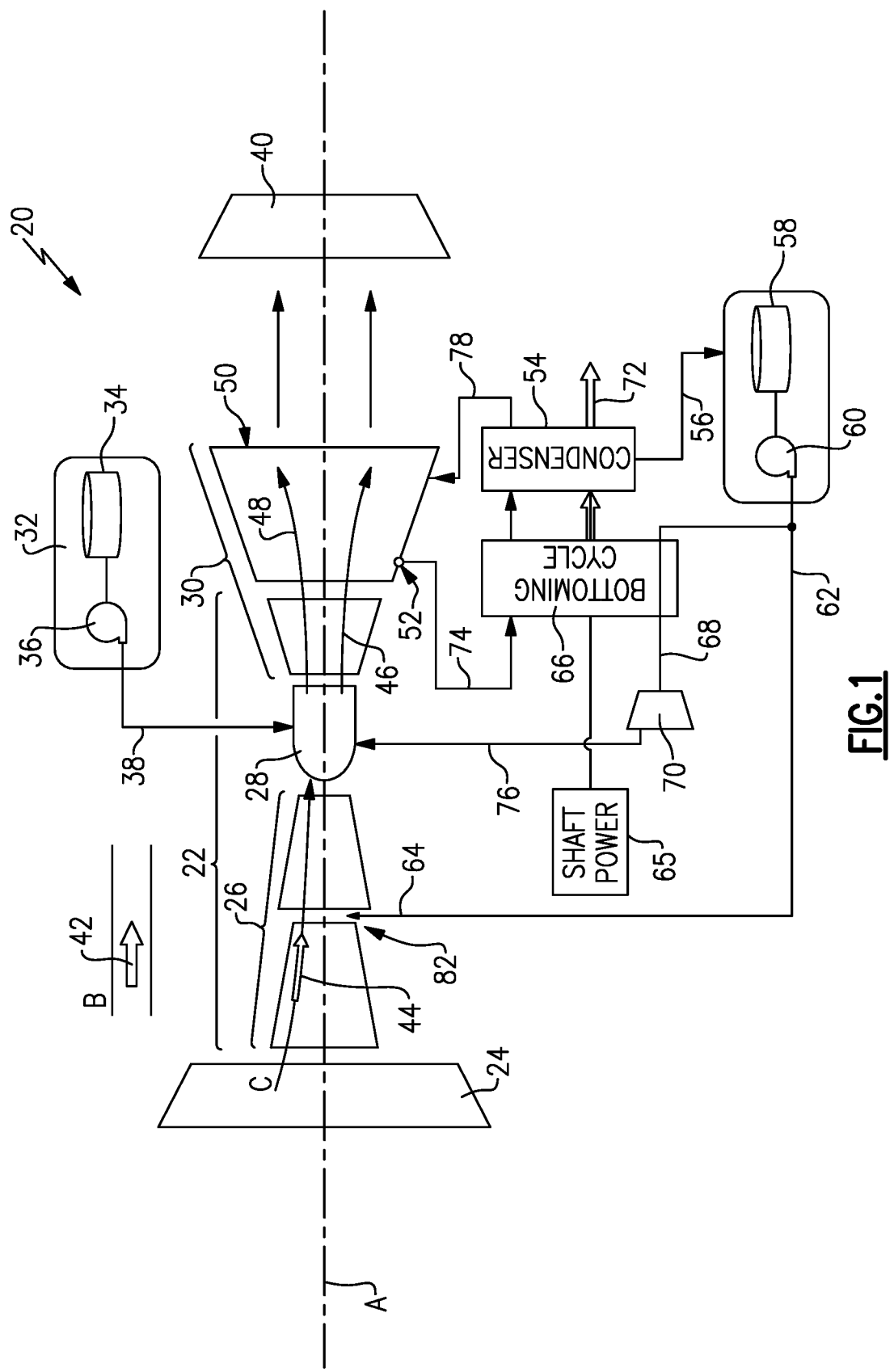
FIG. 1 is a schematic view of an example aircraft propulsion system embodiment.

FIG. 1 schematically illustrates an example propulsion system 20 that includes a bottoming cycle configured to precool a portion of an exhaust gas flow supplied to a condenser for extraction of water. The example bottoming cycle may also be configured to generate a steam flow for injection into the core flow path.

The example propulsion system 20 includes a fan section 24 and a core engine 22. The core engine 22 includes a compressor section 26, a combustor section 28 and the turbine section 30 disposed along an engine longitudinal axis A. The fan section 24 drives a bypass airflow 42 along a bypass flow path B, while the compressor section 26 draws a core flow 44 along a core flow path C. The core flow 44 is compressed and communicated to the combustor section 28 where the compressed core flow 44 is mixed with a fuel flow 38 and ignited to generate an exhaust gas flow 46. The exhaust gas flow 46 expands through the turbine section 30 where energy is extracted and utilized to drive the fan section 24 and the compressor section 26.

Although an example engine architecture is disclosed by way of example, other turbine engine architectures are within the contemplation and scope of this disclosure. Moreover, although the disclosed non-limiting embodiment depicts a turbofan turbine engine, it should be understood that the concepts described herein are not limited to use with turbofans as the teachings may be applied to other types of turbine engines. Additionally, the features of this disclosure may be applied to other engine configurations utilized to generate shaft power.

A fuel system 32 includes at least a fuel tank 34 and a fuel pump 36 to provide the fuel flow 38 to the combustor 28. The example fuel system 32 is configured to provide a hydrogen based fuel such as a liquid hydrogen ($LH_2$). Although hydrogen is disclosed by way of example, other non-carbon based fuels could be utilized and are within the contemplation of this disclosure. Moreover, the disclosed features may also be beneficial in an engine configured to operate with traditional carbon fuels and/or biofuels, such as sustainable aviation fuel.

A condenser 54 receives a partial portion of the exhaust gas flow 46. The condenser 54 extracts water 56 from the partial portion of the exhaust gas flow 46. The water is then routed to a tank 58. The water 56 in the tank 58 is pressurized by a pump 60 for communication to targeted locations within the core engine 22.

The exhaust gas flow 46 is a mix of steam, and components from combustion of fuel. The components from combustion can include, among other possible components, nitrogen, carbon dioxide and oxygen. These combustion components reduce the ease of condensing liquid water from the exhaust gas flow 46 in condenser 54. Moreover, cold sinks such as the bypass airflow 42 and the cryogenic fuel flows 38 have a limited capacity for cooling that may further limit condenser operation. The example propulsion system 20 provides for improved condenser operation by separating the exhaust gas flow 46 into a first exhaust gas flow 48 and a second exhaust gas flow 74. Only the second exhaust gas flow 74 is communicated to the condenser 54. The first exhaust gas flow 48 continues through the turbine section 30 and out through an aft turbine exit 50 to a nozzle 40.

In one disclosed example, the second exhaust gas flow 74 is equal to or less than that of the first exhaust gas flow 48. In another disclosed example, the second exhaust gas flow 74 is less than about 40% of the total exhaust gas flow 46.

In one disclosed example, the second exhaust gas flow 74 is drawn from a location 52 that is upstream of the turbine exit 50. Exhaust gas from the upstream location 52 is of a higher pressure and temperature than the exhaust gas flow 48 that proceeds through the turbine section 30. The higher pressures and temperatures of the second exhaust gas flow 74 may present challenges to cooling to temperatures required to condense and extract water.

The example propulsion system 20 includes the bottoming cycle 66 to precool the second exhaust gas flow 74 prior to communication with the condenser 54. The example bottoming cycle 66 utilizes heat from the second exhaust gas flow 74 to generate the steam flow 68. The generation of the steam flow 68 provides some cooling to the second exhaust gas flow 74. Additional heat may be removed by actively cooling portions of the bottoming cycle with other cooling flows.

A steam turbine 70 may be provided to recover some of the energy imparted during the generation of the steam flow 68. The higher temperatures and pressures of the second exhaust gas flow 74 may impart thermal energy that can be recovered prior to communication to the combustor 28. Although the steam turbine 70 is shown by way of example as an optional feature, the example system 20 does not require the steam turbine 70 for operation.

Moreover, work may be extracted from the bottoming cycle 66 in the form of shaft work schematically indicated at 65. The shaft work 65 may be utilized to drive accessory components utilized for operation of the propulsion system 20 and/or other aircraft related devices.

A portion of the extracted water 56 is communicated as an intercooling flow 64 to a location along the core flow path C. In one disclosed example embodiment, the intercooling flow 64 is injected at a location 82 within the compressor section 26. Other locations along the core flow path C may also receive a portion of the intercooling flow to improve compressor and engine efficiency.

Figure 2:
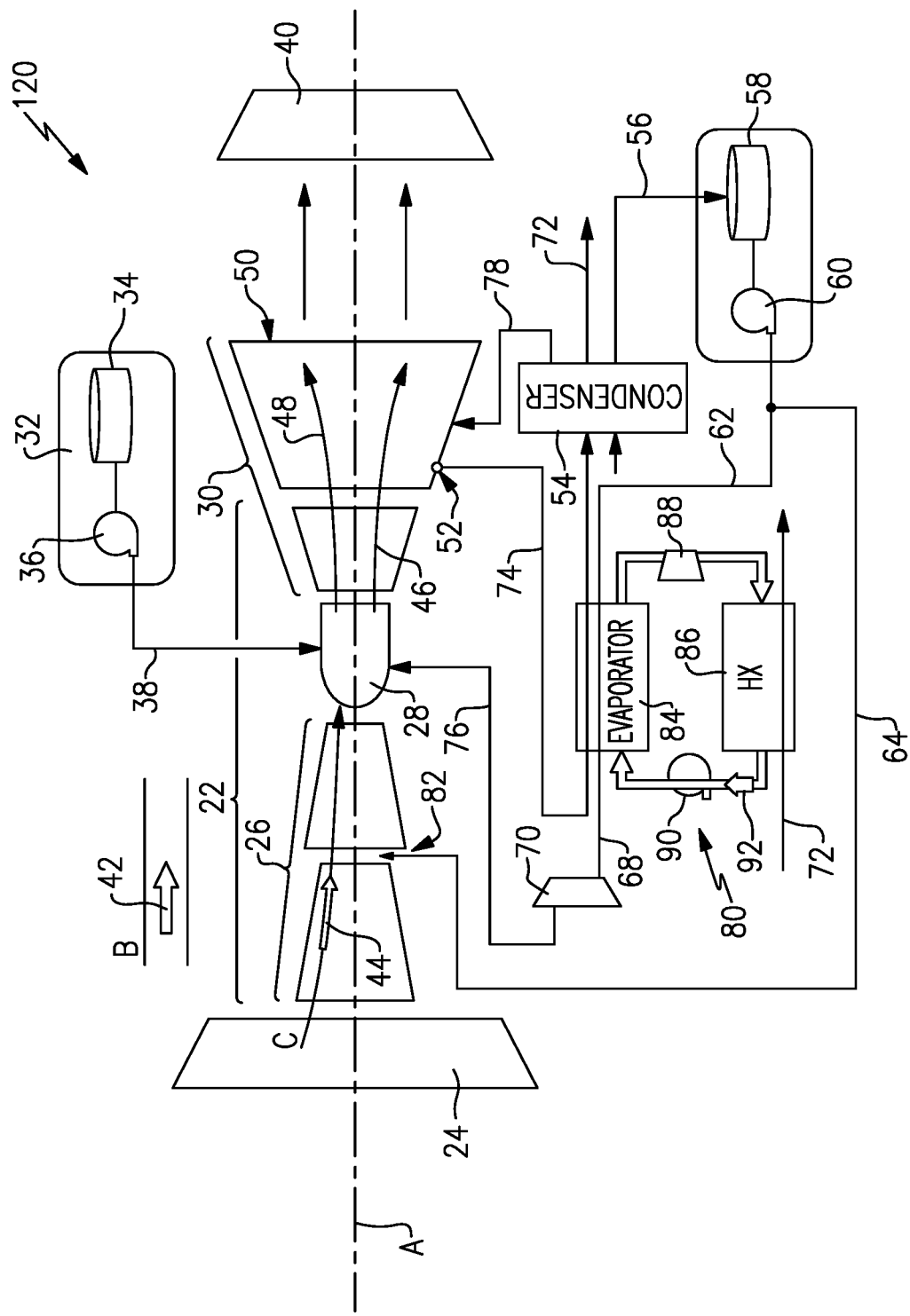
FIG. 2 is another schematic view of another example aircraft propulsion system embodiment.

Referring to FIG. 2, another example propulsion system 120 is shown and includes a bottoming cycle 80 with a thermal transfer medium 92 that is circulated by a pump 90 between an evaporator 84, a turboexpander 88 and a heat exchanger 86. The example bottoming cycle 80 is in communication with the second exhaust gas flow 74 and the pressurized water flow 62. Heat from the second exhaust gas flow 74 is utilized to transform the water flow 62 into the steam flow 68. The same heat transfer results in a precooling of the second exhaust gas flow 74 that is communicated to the condenser 54. The precooling of the second exhaust gas flow 74 improves condenser operation in extracting water 56. The thermal transfer medium 92 provides for an additional acceptance of thermal energy from the exhaust gas flow 74 to further precool the second exhaust gas flow 74 prior to communication to the condenser 54.

In the bottoming cycle 80, the thermal transfer medium 92 accepts heat from the second exhaust gas flow 74 and is heated. The heated thermal transfer medium 92 is expanded through the turboexpander 88 and further cooled in a heat exchanger 86. The cooled thermal transfer medium is then pressurized by the pump 90 to begin the cycle again by accepting heat within the evaporator 84.

The example heat exchanger 86 is cooled by the cooling flow 72. The cooling flow 72 may be a portion of the bypass flow 42, the fuel flow 38 and/or a portion of the water flow 64 extracted by the condenser 54.

Although the bottoming cycle 80 is shown and described by way of example, other bottoming cycle and energy recovery cycles may also be utilized within the contemplation and scope of this disclosure.

Accordingly, the example propulsion systems provide precooling of a portion of an exhaust gas flow to improve condenser operation. Although specific features and components are described by way of example in combination, each of the features and components described in the various example embodiments could be combined differently and remain within the contemplation and scope of this disclosure.

Accordingly, extraction of water from only a portion of the exhaust gas flow as is shown and illustrated by the disclosed example propulsion systems can alleviate challenges presented by condensing all of the exhaust gas flow and combined with targeting the extracted water to specific uses can improve engine efficiency.

Although an example embodiment has been disclosed, this disclosure is not intended to be just a material specification but is instead illustrative such that a worker of ordinary skill in this art would recognize that certain modifications are within the scope and contemplation of this disclosure. For that reason, the following claims should be studied to determine the scope and content of this disclosure.

What is claimed is:

1. A method of operating an aircraft propulsion system, the aircraft propulsion system comprising a compressor section where an inlet airflow is compressed, a combustor section where the compressed inlet airflow is mixed with fuel and ignited to generate an exhaust gas flow that is communicated through a core flow path, a turbine section through which the exhaust gas flow expands to generate a mechanical power output, wherein a total exhaust gas flow is split into at least a first exhaust gas flow and a second exhaust gas flow, where the first exhaust gas flow continues through the turbine section and out through an aft turbine exit and the second exhaust gas flow is drawn f rom a location within the turbine section that is upstream of the aft exit of the turbine section, a condenser where water is extracted from the second exhaust gas flow, wherein, of the first exhaust gas flow and the second exhaust gas flow, only the second exhaust gas flow is communicated through the condenser such that water is only extracted from the second exhaust gas flow, a bottoming cycle where extracted water is transformed into a steam flow and injected into the core flow path, and a nozzle where the first exhaust gas flow exhausted from the aft turbine exit is exhausted, the method comprising:

generating the total exhaust gas flow;
splitting the total exhaust gas flow into the first exhaust gas flow, that is expanded through the turbine section and out the aft turbine exit, and a second exhaust gas flow;
exhausting the second exhaust gas flow from the location within the turbine section that is upstream of the aft turbine exit;
cooling the second exhaust gas flow with a portion of the bottoming cycle;
extracting water from the second exhaust gas flow in the condenser; and generating the steam flow from the extracted water with thermal energy from the second exhaust gas flow.

2. The method as recited in claim 1, further including cooling a portion of a core flow with a portion of water extracted from the second exhaust gas flow.

3. An aircraft propulsion system comprising:
a compressor section where an inlet airflow is compressed;
a combustor section where the compressed inlet airflow is mixed with fuel and ignited to generate an exhaust gas flow that is communicated through a core flow path;
a turbine section through which the exhaust gas flow expands to generate a mechanical power output, wherein a total exhaust gas flow is split into at least a first exhaust gas flow and a second exhaust gas flow, where the first exhaust gas flow continues through the turbine section and out through an aft turbine exit and the second exhaust gas flow is drawn from a location within the turbine section that is upstream of the aft exit of the turbine section; and
a condenser where water is extracted from the second exhaust gas flow, wherein, of the first exhaust gas flow and the second exhaust gas flow, only the second exhaust gas flow is communicated through the condenser such that water is only extracted from the second exhaust gas flow; and
a bottoming cycle where extracted water is transformed into a steam flow and injected into the core flow path; and
a nozzle where the first exhaust gas flow exhausted from the aft turbine exit is exhausted.

4. The aircraft propulsion system as recited in claim 3, wherein the bottoming cycle is configured to extract heat from the second exhaust gas flow for generating the steam flow.

5. The aircraft propulsion system as recited in claim 4, wherein the bottoming cycle is configured to precool the second exhaust gas flow prior to communication to the condenser.

6. The aircraft propulsion system as recited in claim 3, wherein the bottoming cycle comprises a closed circuit where a thermal transfer medium is heated in an evaporator, pressurized in a compressor, and cooled within a heat exchanger, and wherein a portion of the second exhaust gas flow is cooled in the evaporator and communicated to the condenser.

7. The aircraft propulsion system as recited in claim 6, wherein the bottoming cycle further includes a pump for pressurizing the thermal transfer medium communicated through the evaporator.

8. The aircraft propulsion system as recited in claim 6, wherein the heat exchanger is in thermal communication with a cold sink flow for cooling the thermal transfer medium.

9. The aircraft propulsion system as recited in claim 8, wherein the cold sink flow comprises at least one of a cooling airflow, a cryogenic fuel flow or a water flow.

10. The aircraft propulsion system as recited in claim 3, further including a steam turbine where power is extracted from the steam flow prior to injection into the core flow path.

11. The aircraft propulsion system as recited in claim 3, including an intercooling system and a portion of water extracted by the condenser is communicated to the intercooling system for cooling a portion of a core flow within the compressor section.

12. The aircraft propulsion system as recited in claim 3, including a propulsive fan driven by the turbine section.

13. The aircraft propulsion system as recited in claim 3, wherein the second exhaust gas flow is less than 40% of the total exhaust gas flow.

14. The aircraft propulsion system as recited in claim 3, wherein the second exhaust gas flow has a pressure and a temperature that is greater than a pressure and a temperature of the first exhaust gas flow.

* * * * *